Patented Oct. 30, 1923.

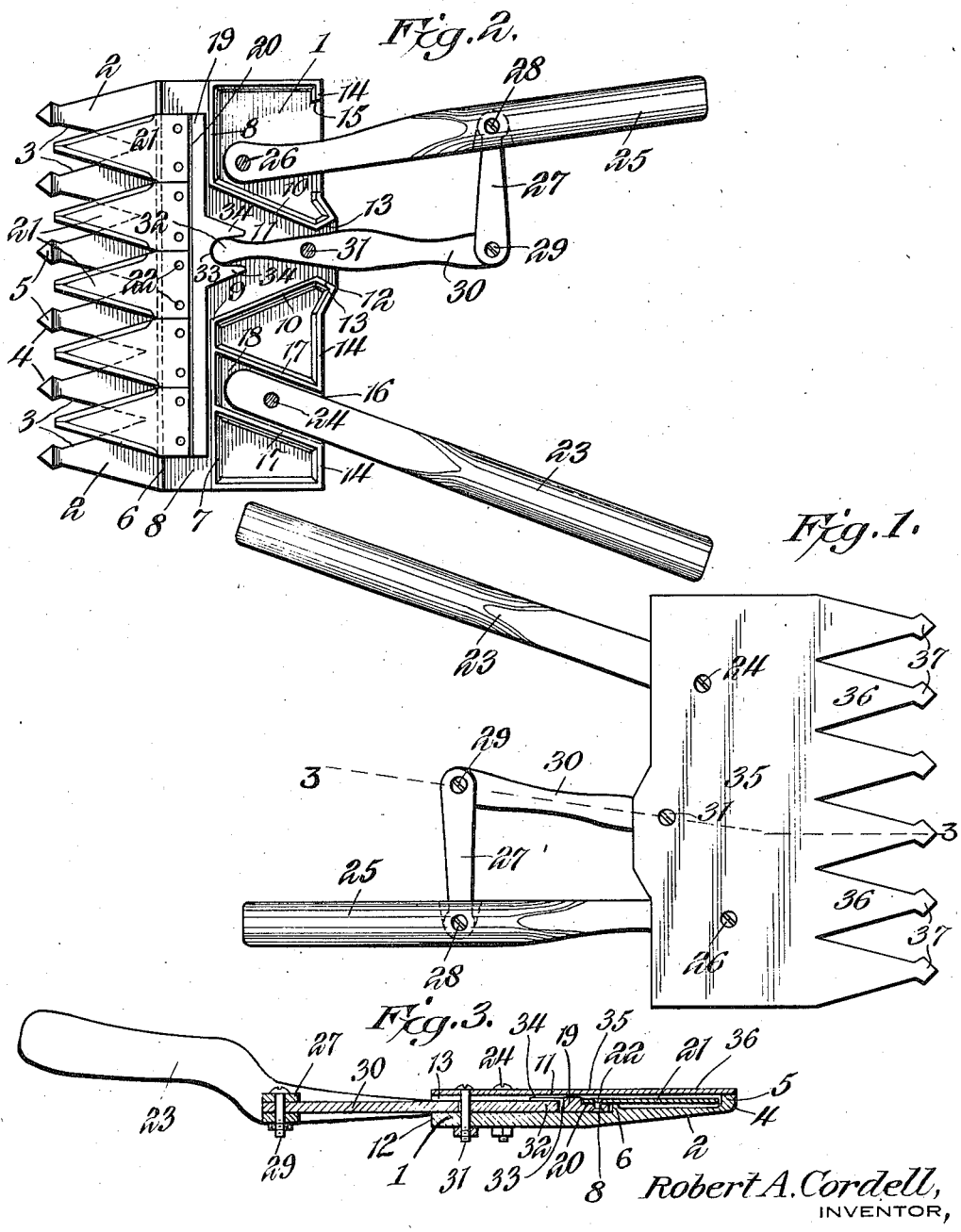

1,472,633

UNITED STATES PATENT OFFICE.

ROBERT A. CORDELL, OF NORFOLK, VIRGINIA.

HEDGE TRIMMER.

Application filed May 26, 1922. Serial No. 563,941.

*To all whom it may concern:*

Be it known that I, ROBERT A. CORDELL, a citizen of the United States, residing at Norfolk, in the county of Norfolk and State of Virginia, have invented new and useful Improvements in Hedge Trimmers, of which the following is a specification.

This invention relates to hedge trimmers.

The object is to provide a device of this character wherein the cutting element is of the mower blade type having a plurality of cutting teeth housed and guarded on the top and bottom sides thereof, the bar carrying the teeth being easily operated by hand to cause an effective severing action through the medium of power increasing leverage.

Another object is to provide a hedge trimmer having these characteristics which is small, of light weight and compact so that the same may be readily handled and operated for great lengths of time without unduly tiring the operator, it being unnecessary to constantly hold the device in contact with the stalks and to force the same forward, as in the use of the ordinary trimmer, by reason of the construction of the forwardly extending fingers above and below the cutting teeth, the said fingers being provided with enlarged heads which serve to retain the stalks in position to be cut and to prevent their being forced forwardly by the coacting, oppositely bevelled edges of the cutting teeth and guard fingers respectively.

A full and complete understanding of the invention may be obtained from a consideration of the following detailed description, taken in connection with the accompanying drawing forming a part of this specification, it being understood that while the drawing shows a practical form of the invention, the latter is not confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a plan view of the improved hedge trimmer;

Figure 2 is a similar view with the top cover plate removed to show the operating mechanism for actuating the reciprocating cutter bar;

Figure 3 is a transverse sectional view taken substantially on the line 3—3 of Figure 1.

The continued operation of the ordinary hedge trimming devices of the shear type is so laborious as to be almost impossible except by exceptionally strong persons, and the device of the present invention has been designed with a view to enable others to operate the same with ease and comfort, the weight of the device having been reduced to a minimum, and the power derived from the peculiar arrangement of the parts being increased to the maximum so that it is a comparatively easy matter to actuate the reciprocating cutter bar to engage and to sever a plurality of stalks of the hedge at one time and cut a wide swath through the same.

The hedge trimmer comprises a base plate 1 of generally rectangular shape, and preferably in the form of a casting made from suitable metal, and is somewhat longer than wide, one long side being provided with a plurality of outstanding fingers 2 formed integrally therewith and having their side edges 3 inclined with respect to the longitudinal axis of each tooth, so that the latter are, in effect, triangular shape. At the outer end, each tooth is provided with a diamond-shaped head 4, with a point directed toward the front, and the outer half of the said head is raised, as at 5, for a purpose to be explained.

At the base of the teeth adjacent to the point where they contact with each other, the base plate 1 is provided with a longitudinally disposed, upstanding rib 6 extending from end to end of the same, the surface of the base proper, in rear of said rib, being somewhat lower than the upper surface of the fingers, as clearly shown in Figure 3 of the drawing.

In rear of and in spaced relation to the rib 6, there is another longitudinally disposed rib 7, formed integrally with the base 1 and defining therewith, a longitudinally disposed channel 8 extending entirely across the base plate, lengthwise thereof. The rib 7 is provided with an opening 9 intermediate of the ends, and adjoining ribs 10 are extended toward the rear edge of the base, said ribs 10 approaching each other toward the rear to define a triangular space 11 between the same. The base 1 is formed with an extension 12 at a point coinciding with the rear ends of the ribs 10, and the latter are flared outwardly, at 13, and along the opposite margins of the extension 12 and merge into marginal beads 14 located at the rear, long side edge of the base plate 1.

The triangular space 11 is located, preferably, somewhat closer to the right hand side of the base than to the left, and the rear marginal bead 14, at this side of the base plate, is provided with an opening 15, for a purpose to be explained, while the rear marginal bead 14 at the left hand side of the base is provided with another opening 16, and the sides of said opening are joined to the front bead 8 by beads 17 arranged at an angle to the side edges of the base plate and defining an angularly disposed recess 18.

A cutter bar 19 of a width to slidably fit between the ribs 6 and 7, is adapted to transversely reciprocate in the channel 8, the said bar being somewhat shorter than the length of the base plate and provided along its front edge with a mortice 20, the upper edge of the bar being substantially flush with the upper edges of the rib 7 and those connected therewith.

A plurality of cutting teeth 21 of the ordinary triangular shape are adapted to have their base portions secured in the mortice 20 of the cutter bar, as by rivets 22, and the forwardly extending, tapered portions of the teeth rest upon the upper edge of the rib or bead 6, the said tapered portions being beveled or sharpened in the usual manner.

A handle 23, preferably formed round throughout the major portion of its length, is squared at one end, and is introduced into the angularly disposed recess 18 and is held therein by a bolt or rivet 24. This handle constitutes the left hand handle, and is, as shown, arranged at an angle to the longitudinal axis of the device, while the right hand handle 25, which is, like the handle 23, formed of wood and rounded at the grasping portion, is introduced through the opening 15 of the rear marginal bead 14, and is fulcrumed at its end by the bolt or rivet 26 which is located adjacent to the rib 8 where the same joins to the forwardly extending, flared bead 10. The handle 25 constitutes the operating handle of the device, and is adapted to be swung inwardly and outwardly about its pivot 26, when actuated by the right hand of the operator, the extent of the opening 15 permitting of such swinging action.

A link or pitman 27 is pivoted at one end, by a screw or bolt 28 to an intermediate point of the handle 25, the latter being suitably grooved or slotted for the purpose, and the other end of the pitman is normally located in substantial longitudinal alinement with the center of the cavity or space 11, and is pivotally connected by a bolt 29 to the rear end of an actuating lever 30 extending forwardly and into the said cavity or space 11, where it is fulcrumed by a pivotal bolt 31 secured to the base and located adjacent to the mouth of the space 11. The forward end of the lever 30, beyond the pivot 31 is much shorter than the rear end of said lever, and is provided with a ball end 32 which fits into a round, open socket 33 formed between two rearwardly directed lugs 34, cast integrally with and on the rear edge of the reciprocating cutter bar 19.

A top closure plate 35 having the same configuration as the base plate, and provided with forwardly extending fingers 36 to coact with the fingers 2 of the base, and terminating in diamond shaped heads 37 to rest upon the portions 5 of the heads 4, is applied to the structure, after the parts are properly assembled, and is held in position by means of the screws or bolts 24, 26 and 31. The top plate is thus supported in spaced relation to the base by means of the forward ends of the fingers and the several beads or ribs, so that the operating parts of the device may freely move to cause the actuation of the cutter bar.

When the device is supported by the left hand of the operator, and the handle 25 is grasped by the right hand, and the latter lever caused to swing about its pivot 26, the pitman 27 is forced inwardly, and the lever 30, which constitutes a lever of the first class, is rocked about its pivot 31. By reason of the increased leverage obtained through the disposition of the fulcrum 31, the forward end of the lever 30 will move the cutter bar in one direction or the other with great power, and the sharpened cutting edges of the teeth 21 will be reciprocated through and between the tapering sides of the fingers 2 of the base and fingers 36 of the cover plate in such manner as to easily sever all hedge stalks encountered, the flaring heads 4 and 37 serving to effectively prevent the same from being pushed or squeezed forwardly and out of the cutting position, as will be readily understood.

If desired the cutting teeth 21 may be manufactured in a continuous piece, the bases of the same being joined together and inserted in the mortice 20 of the cutter bar and held in position thereon by screws in the same manner as the first described form. This will enable the manufacture of the teeth at a reduced rate and either form will permit of ready installation of teeth in the event of breakage or impairment.

From the foregoing it will be seen that a simple, cheaply manufactured and easily operated hedge trimming device has been provided, which may be readily operated by a woman or a child without injury to the hands or becoming greatly fatigued, the device being constructed of few parts, easily kept in operative condition, and readily exposed for inspection or repair by simply removing the cover plate.

What is claimed is:—

1. A hedge trimmer comprising a base plate, forwardly-extending rigid fingers carried by the base plate at one side and terminating in enlarged heads which are raised above the fingers, said base plate having spaced transverse ribs defining a channel which is arranged transversely of the fingers, spacing beads formed on the base plate, a cutter bar adapted to reciprocate transversely in said channel and having teeth which are shorter than said fingers, a cover plate adapted to rest on said beads and the heads at the ends of the fingers and supported above the cutter bar, said plate conforming in shape to the base plate and to the fingers and having forwardly-extending fingers with enlarged heads to cover the fingers and heads of the base plate, and manually operated means for reciprocating the cutter bar.

2. A hedge trimmer comprising a base plate supported at one side by a rigid handle, forwardly extending fingers carried by the base plate on the side opposite the supporting handle and terminating in diamond shaped heads, said base plate having spaced ribs defining a channel arranged transversely of the handle and fingers, spacing beads formed on the base and along the rear edge of the same, the latter being provided with an opening near the center of the base and another opening near the end opposite the supporting handle, a cover plate adapted to rest on said beads and the heads at the ends of the fingers, said plate conforming in shape to the base and the fingers, an operating handle extending through the end opening in the rear of the base and fulcrumed at its inner end thereto, a lever of the first class extending through the central opening and having its major portion extending rearwardly, a pitman connecting the rear end of the lever to the operating handle, a cutter bar mounted for reciprocating movement in the channel of the base and having ball and socket connection with the inner end of the lever, and cutting teeth mounted on the bar and adapted to coact with the fingers when the operating handle is actuated.

In testimony, that I claim the foregoing as my own, I have hereto affixed my signature.

ROBERT A. CORDELL.